United States Patent [19]

Win et al.

[11] 4,016,040

[45] Apr. 5, 1977

[54] PREPARATION OF ENZYME-CONTAINING BEADS

[75] Inventors: Maung Hla Win, Berkeley Heights; Walter Anthony DiSalvo, North Arlington; Edward Joseph Kenney, Bernardsville, all of N.J.

[73] Assignee: Colgate-Palmolive Company, New York, N.Y.

[22] Filed: Nov. 1, 1974

[21] Appl. No.: 519,827

Related U.S. Application Data

[60] Division of Ser. No. 347,534, April 3, 1973, Pat. No. 3,858,854, which is a continuation of Ser. No. 98,111, Dec. 14, 1970, abandoned, which is a continuation-in-part of Ser. No. 883,955, Dec. 10, 1969, abandoned.

[52] U.S. Cl. .................................. 195/68; 195/63; 195/DIG. 11; 252/DIG. 12; 264/13

[51] Int. Cl.[2] .......................................... C07G 7/02

[58] Field of Search ............... 195/63, 68, DIG. 11; 252/DIG. 12, 89; 264/4, 13

[56] References Cited

UNITED STATES PATENTS

| | | | |
|---|---|---|---|
| 3,207,666 | 9/1965 | Houtgraaf et al. | 264/4 X |
| 3,519,570 | 7/1970 | McCarty | 195/63 X |
| 3,573,170 | 3/1971 | Clark et al. | 195/63 |
| 3,775,331 | 11/1973 | Borrello | 195/68 X |
| 3,801,463 | 4/1974 | Eygermans | 195/68 |
| 3,853,780 | 12/1974 | Mostow et al. | 252/DIG. 12 X |
| 3,858,854 | 1/1975 | Win et al. | 195/63 X |

OTHER PUBLICATIONS

Chemicals Used in Food Processing, Publication 1274, National Research Council, 1965, Washington, D.C. (pp. 49 & 50).

*Primary Examiner*—David M. Naff
*Attorney, Agent, or Firm*—Robert L. Stone; Murray M. Grill; Herbert S. Sylvester

[57] ABSTRACT

Granular free-flowing non-dusting, spherical enzyme-containing beads for use in detergents are prepared by spraying droplets of a blend consisting essentially of a molten nonionic detergent and an enzyme concentrate from a spray nozzle into cool air in a cooling tower to solidify the droplets and form tiny spherical beads.

3 Claims, 3 Drawing Figures

PREPARATION OF ENZYME-CONTAINING BEADS

This application is a division of Ser. No. 347,534, filed Apr. 3, 1973, now U.S. Pat. No. 3,858,854, which application was a continuation of Ser. No. 98,111, filed Dec. 14, 1970, now abandonded, which was a continuation-in-part of Ser. No. 883,955, filed Dec. 10, 1969, now abandonded.

This invention relates to a method of making a granular non-dusting composition for use in laundry products.

Powdered enzymes have been employed in presoak and washing detergent compositions since they are particularly effective against various common stains which are fixed to textiles and laundry. In particular, proteolytic enzymes, which possess the ability to digest and degrade protein matter, are effective in removing from textiles and laundry proteinic stains such as blood, sweat, milk, cocoa, gravy and other sauces and the like. This digestion or degradation of protein matter facilitates removal of dirt by the detergent. Amylases and lipases are also useful in detergent cleaning.

It has been suggested to bind various compounds which are common builder salts in their hydratable form with enzymes. This may be done by contacting enzyme with an anhydrous or partially hydrated salt and adding water in insufficient amount to fully hydrate the salt. It has also been suggested that a slurry of an enzyme in a molten nonionic detergent be sprayed onto base granules of builder salt or onto base granules of a built detergent composition so that the enzyme becomes attached to the surface of the base granules by means of the nonionic; the base granules may then be further sprayed with additional nonionic detergent to at least partially encapsulate the enzymes on the surface of the base granules.

In accordance with one aspect of this invention there is provided an entirely new type of enzyme product, one which is capable of being blended with granular detergent compositions to yield easily flowing products of good stability and odor, resistance to caking, and most important, without the formation of any significant detectable enzyme-containing dust. The invention also makes it possible to make such detergent products of very accurately controlled and uniform enzyme content.

In accordance with one aspect of the invention an enzyme-containing preparation is blended with a molten normally solid nonionic detergent and the resulting blend is sprayed into a cool atmosphere to form tiny solidified droplets of the blend. These solidified droplets, or beads, are substantially spherical and despite the soft waxy nature of the nonionic detergent they flow very easily. Even when handled mechanically under severe conditions, e.g. when tumbled roughly with built detergent granules, they yield substantially no enzyme-containing dust and keep their identities. Mixtures of these enzyme-containing beads and detergent granules also flow well and have good stability and odor. Although such mixtures may form dust in the air under severe handling, the dust is found to be enzyme-free. The enzyme-containing beads dissolve very rapidly in water, releasing their enzyme content to the wash water quickly (e.g. in water at 40° C).

In a preferred form of the invention the nonionic detergent is a waxy water-soluble material having a melting point up to about 60°. In such preferred form the melting point is at least 45° C, preferably at least 50° and not above 60° C, and the nonionic detergent contains a hydrophilic polyethylene oxide chain attached to a hydrophobic radical. Particularly suitable types of materials are those which are ethylene oxide adducts of long chain alkanols (e.g. alkanols of about 12 to 20 carbon atoms) or long chain alkyl phenols (e.g. phenols having alkyl side chains of about 8 to 18 carbon atoms). Other nonionic detergents are ethylene oxide adducts of long-chain alkyl thiophenols; ethylene oxide adducts of monoesters of hexahydric alcohols and inner ethers thereof such as sorbitan monolaurate, sorbitol monooleate and mannitan monopalmitate; ethylene oxide adducts of polypropylene glycol (e.g. Pluronics, such as those of suitable melting point listed on page 312 of the book "Nonionio Surfactants" edited by Schick, published 1967 by Marcel Dekker, Inc., N.Y.); and ethylene oxide adducts of long chain fatty acids such as palmitic acid; ethylene oxide adducts of partial esters (e.g. monoesters) of such fatty acids and glycerol; and ethylene oxide adducts of amides of such fatty acids (e.g. lauramide). The polyethylene oxide chains of the above nonionic detergents are ovf 6 to 84 ethylene oxide units.

The enzyme preparation to be mixed with the molten nonionic detergent may be an extremely fine, often substantially, impalpable powder. In a typical powdered enzyme preparation the particle diameter is mainly below 0.15 mm, generally above 0.01 mm, e.g. about 0.1 mm; for example, as much as 75% or more of the material may pass through a 100 mesh sieve. At present the commercial enzyme preparation are usually mixtures of an organic enzyme concentrate with a solid diluent salt, such as calcium sulfate, sodium chloride, sodium sulfate and other inert materials (e.g. clay). Such commerical preparations, sold by enzyme manufacturers, may be used in the practice of this invention. The invention, however, finds its greatest utility when it is used by the enzyme manufacture in a process in which the organic enzyme concentrate (as produced, and substantially free of diluent salt) is blended directly with the substantially anhydrous molten nonionic and the heated blend is sprayed into a cool atmosphere to produce the tiny spherical beads, which may then be sold to detergent manufacturers for blending with various washing products, e.g. with built detergent granules. The new dust-free enzyme-containing beads may also be sold directly to the consumer, e.g. in small moisture-proof packets (of, say, polyethylene film) containing sufficient enzyme for a single washing, so that the housewife may add such beads directly to the wash water.

In the preferred form of the invention the enzyme comprises a proteolytic enzyme which is active upon protein matter and catalyzes digestion or degradation of such matter when present as in linen or fabric stain in a hydrolysis reaction. The enzymes may be effective at a pH range of say about 4–12, and may be effective even at moderately high temperatures so long as the temperature does not degrade them. Some proteolytic enzymes are effective at up to about 80° and higher. They are also effective at ambient temperature and lower to about 10° C. Particular examples of proteolytic enzymes which may be used in the instant invention include pepsin, trypsin, chymotrypsin, papain, bromelin, colleginase, keratinase, carboxylase, amino peptidase, elastase, subtilisia and aspergillopepidase A and B. Preferred enzymes are subtilisin enzymes manufactured and cultivated from special strains of spore forming bacteria, particularly *Bacillus subtilis*.

Proteolytic enzymes such as Alcalase, Maxatase, Protease AP, Protease ATP 40, Protease ATP 120, Protease L-252 and Protease L-423 are among those enzymes derived from strains of spore foaming bacillus, such as *Bacillus subtillis*.

Different proteolytic enzymes have different degrees of effectiveness in aiding in the removal of stains from textiles and linen. Particularly preferred as stain removing enzymes are subtilisin enzymes.

Metalloproteases which contain divalent ions such as calcium, magnesium or zinc bound to their protein chains are of interest.

The production of various proteolytic enzyme concentrates is described in the patent literature: for example in German Offenlegenschrift 1,800,508 and in published Dutch patent application No. 6,815,944.

Instead of, or in addition to, the proteolytic enzyme, an amylase may be present such as a bacterial amylase of the alpha type (e.g. obtained by fermentation of B. subtilis). One very suitable enzyme mixture contains both a bacterial amylase of the alpha type and an alkaline protease, preferably in proportions to supply about 100,000 to 400,000 Novo alpha-amylase units per Anson unit of said alkaline protease.

The enzyme preparation may, as previously indicated, be incorporated as a powdered salt-containing product, or as a product containing little or no salt. Thus, an aqueous culture liquid or broth (containing the enzyme present therein as a result of bacterial growth) can be centrifuged to remove much of the solids, then precipitated from the liquid (as by means of cold ethanol or other percipitant such as sodium sulfate solution), after which the precipitated solids are separated from much of the liquid, as by centrifuging again, while washing with, say, cold ethanol or by filtering, and then dried at low temperature (e.g. in a vacuum or in drying chamber at, say, 40°C., or by spray-drying) to form a dry enzyme concentrate in powder form (as described, for instance, in German Offenlegenschrift 1,800,508) which is then blended into the molten nonionic detergent. The enzyme concentrate may be given a preliminary purification, as by redissolving it in water and then passing the solution over activated charcoal, and treating the resulting liquid to precipitate and recover an enzyme concentrate in the manner previously described.

The enzyme described in German Offenlegenschrift 1,800,508, mentioned above, are proteases of the serine type produced by culture of the genus bacillus and show optimum proteolytic activity against hemoglobin at a pH value higher than 9 (e.g. pH 10, 10.5, 11 or 12). Particularly suitable is the enzyme designated in that German Offenlegenschrift as C372 or the enzyme sold by Novo Industri A/S as SP-72.

The concentration of the enzyme in the beads of this invention may be varied. It is conveniently expressed, for proteolytic enzymes, in terms of Anson units. Thus, the blend of nonionic detergent and enzyme concentrate from which the beads of this invention are produced may contain an amount of enzyme concentrate such as to give beads containing about 0.1 to 5 Anson units or more per gram. There is substantially no loss of enzyme activity during the formation of the beads, particularly when the temperature of the blend is maintained below 65° C. The blend of molten nonionic detergent and enzyme concentrate may contain, for instance, in the range of about 5 to 50% of enzyme concentrate. The blending may be effected by simply adding the powdered enzyme concentrate to the molten nonionic detergent while stirring. In the manufacture of the enzyme concentrate it may be found that there is a batch-to-batch variation in its enzyme content. Before blending with the nonionic detergent, the enzyme concentrate may be assayed; the amount of such concentrate of each batch added to the molten nonionic detergent may then be varied (in accordance with the assay) from batch to batch to produce blends having a prdetermined substantially constant enzyme content.

The enzyme-containing granules or beads produced in accordance with this invention may be added to a wide variety of washing products. Thus, they may be incorporated in a laundry presoak product or in a laundry detergent or in a dishwashing product. These washing products may be in granular form, e.g. they may be spray-dried hollow granules of the washing product. It is also within the broader scope of the invention to use other granular forms of the washing product, such as granules made by breaking up porous agglomerates or by cutting extruded thin rods (e.g. spaghetti-like extrudates). Usually the proportion of the enzyme-containing beads in the final product will be small, e.g. in the range of about ½ to 5%.

When the enzyme-containing bends of this invention have a relatively high enzyme content, say about ½ to 3 or more Anson units per gram of beads, they will generally be brownish in color. When mixed with conventional washing products which contain white or light colored (or differently colored) granules these brownish beads are often clearly visible, even when (as is usual) only a small proportion (e.g. ½ to 3%) of the beads is present. We have found that such visibility can be avoided by making the beads generally smaller than the granules of the washing products. Thus, for a washing product containing a large proportion of particles which are retained on a 30 or 40 mesh screen, it is preferred to use beads which are largely able to pass through a 40 mesh screen; this yields a final product in which the brown beads are not noticeable in the mass of granules. The visibility of the beads can also be decreased by the inclusion of very small amounts of an inert white pigment (such as about ½ to 3% of $TiO_2$).

The size of the beads can be controlled by regulating the size of the droplets of the spray of the blend of molten nonionic detergent and enzyme concentrate. As is well known to those skilled in the art of spraying the droplet size will depend on such factors as the viscosity of the material being sprayed, the spraying pressure and the nature of the spray head (e.g. the size of the orifice at the outlet of the spray head and the configuration of the core which imparts a swirling motion to the material, upstream of the outlet orifice). A few trials, in a manner known to those skilled in the spraying art, generally suffice to establish the proper spraying conditions for any given blend with the available equipment. The particle diameter of the beads of this invention is generally below 1mm.

As seen under a microscope, the enzyme-containing beads are essentially spherical (although there are occasional out-of-round beads and a few beads made up of two spheres of different size attached to each other at their outer surfaces). They are generally shiny, having smooth outer surfaces which may be slightly pebbled or dimpled (with small smooth-surface shallow depressions visible under the microscope).

By viewing with a microscope, using transmitted light (e.g. with the beads immersed in a suitable medium such as paraffin oil), it can be seen that the beads contain irregular darker areas (of light brown color) which are of smaller size than the beads in which they are carried (e.g. 1/10 their diameter) and which are encapsulated within the beads and do not project therefrom; the color of these areas indicates that they represent the enzyme concentrate, which thus may not be uniformly distributed throughout a given bead although the distribution of the enzyme from one sample of beads to the next is remarkably uniform. Microscopic examination under transmitted polarized light shows that the nonionic detergent is present in distinctly crystalline form. It also reveals the presence of occasional small air bubbles within the beads, and when the beads are heated to melt them on the microscope stage the resulting change in the index of refraction of the nonionic detergent makes visible the encapsulated crystals of any carrier salt; these crystals are smaller than the beads.

There are indications that the beads have a skin of highly crystalline non-ionic detergent encapsulating a mixture of non-ionic detergent, enzyme concentrate and carrier salt. Thus when a sharp scalpel balde was pressed diagonally against the top of a bead (under a dissecting microscope, using reflected light) the blade appeared to pass easily through the outer portion of the bead and to be deflected by a core (whose thickness is greater than that of said outer portion), given a cut skin fragment which (when viewed with transmitted polarized light) was seen to have a highly crystalline structure. In one case in which this skin fragment was measured it was on the order of 5 microns in thickness.

The following Examples are given to illustrate this invention further. In this application all proportions are by weight and all sieve or screen sizes are U.S. Standard, unless otherwise indicatd.

EXAMPLE 1 a. 19 Parts of a proteolytic enzyme concentrate (in the form of a dark brown salt-containing fine powder whose enzyme content is 4 Anson units per gram) are mixed with 81 parts of a molten nonionic detergent having a melting point of 48° C (Plurafac A-38) to form a free-flowing liquid slurry, which is then sprayed, at a temperature about 5° C. above the melting point of the nonionic detergent, and under pressure, through a single fluid nozzle (of standard type, having a small outlet orifice and having, just upstream of the orifice, a stationary four-vaned core which is arranged to impart a swirling motion to the liquid). during spraying most of the hot slurry is continuously recirculated from the nozzle to the heated storage vessel from which it is pumped continuously to the nozzle.

The spray emerges continuously from the nozzle into at circular tower about 8 feet in diameter and about 40 feet high, to the bottom of which there is supplied a continuous stream of air at a temperature of about 13° C, so that the cool air flows upward into contact with the sprayed droplets, cooling and solidifying them within seconds after they leave the nozzle. The solid beads are collected at the base of the tower. The resulting free-flowing tan beads have the following screen analysis:

| Screen Mesh | Opening (mm) | % Remaining on Screen |
|---|---|---|
| 10 | 2.0 | 0 |
| 20 | 0.84 | trace |
| 40 | 0.42 | 0.7 |
| 60 | 0.25 | 33.2 |
| 80 | 0.177 | 39.8 |
| 100 | 0.149 | 14.9 |
| 200 | 0.074 | 11.2 |
| 270 | 0.053 | 0 |
| 325 | 0.044 | 0 |
| Pan | 0.044 | 0 |

The dust content of the beads is about 18 ppm. This dust content is determined in a standard manner by permitting a given quantity (50 g) of the beads to fall a predetermined distance (in an enclosed device) onto a base, then immediately putting a cover over the fallen beads and allowing any dust to settle for 10 minutes onto the cover.

To make a laundry detergent for use in the automatic machine washing of clothes, one part of the beads is blended with 99 parts of spray-dried hollow white granules of heavy duty built detergent composition having the following approximate screen analysis:

| Screen size: | 10 | 20 | 40 | 60 | 80 | 100 | −100 |
|---|---|---|---|---|---|---|---|
| % Retained: | 0.2 | 2.7 | 29.4 | 40.4 | 13.1 | 6.0 | 8.2 |

The enzyme-containing beads are not noticeable, to the naked eye, in the resulting mixture.

The spray-dried granules of the heavy duty built detergent composition have the following approximate overall composition: 10% sodium linear tridecylbenzenesulfonate; 2% of the ethoxylation product made from ethylene oxide and primary alkanols of C14–C15 chain length, the ethoxylation product containing 11 mols of oxyethylene per mol of alkanol; 2% of sodium soap of a mixture of 3 parts of tallow fatty aicds and 1 part of coconut oil fatty acids; about 8.5% of total moisture; 34% of phosphate solids; 7% of sodium silicate solids ($Na_2O$:$SiO_2$ mol ration 1:2.35); 0.5% of sodium carboxymethyl cellulose; 0.2% of water-soluble polyvinyl alcohol; and the balance sodium sulfate together with small amounts of fluorescent brighteners. The granules of built detergent composition are prepared by spray drying a heated aqueous slurry containing the ingredients described and having a solids content of about 60% (i.e. the slurry has a total moisture content of about 40%). This aqueous slurry is prepared by vigorous agitation in a crutcher and is at a temperature of about 60° C; in making the aqueous slurry the phosphate (supplied as a powder of anhydrous pentasodium tripolyphosphate) is added last, just before spraying. Then the aqueous slurry is sprayed into a spry tower to which heated air, at a temperature well above the boiling point of water, is fed to evaporate off the water, in conventional manner.

b. Example 1a is repreated except that the spray-dried granules having the following screen analysis are employed:

| Screen size: | 10 | 20 | 40 | 60 | 80 | 100 | −100 |
|---|---|---|---|---|---|---|---|
| % Retained: | 1.4 | 18.7 | 41.1 | 22.7 | 6.2 | 3.2 | 6.7 |

EXAMPLE 2

Example 1 is repeated except that the proportions in the beads are 62 parts of the nonionic detergent and 38 parts of the enzyme concentrate.

EXAMPLE 3

Example 1 is repeated except that the proportions in the beads are 90.4 parts of nonionic detergent and 9.6 parts of enzyme concentrate, the cooling air temperature is about 24° C, and the nozzle and spraying conditions are such that a product of the following screen analysis is obtained:

| Screen size: | 10 | 20 | 40 | 60 | 80 | 100 | 200 |
|---|---|---|---|---|---|---|---|
| % Retained: | 0 | 0.4 | 32 | 42.8 | 16.6 | 5.6 | 2.5 |

| Screen size: | 270 | 325 | −325 |
|---|---|---|---|
| % Retained: | 0.1 | 0 | 0 |

The dust content is 80 ppm. The enzyme-containing beads made, as shown in this example and in Example 1, substantially all pass through a 10 mesh U.S. Standard Sieve Series screen and at most 11.2% of said beads pass through a 100 mesh U.S. Standard Sieve Series Screen. Also, as is seen from Examples 1 and 3, the cooling air employed, into which the spray of enzyme and nonionic detergent is directed, is at a temperature of about 13° to 24° C.

EXAMPLE 4

Example 1 is repeated, except that the enzyme-containing beads are made with Triton Surfactant 705 (m.p. 57° C) as the molten nonionic detergent.

EXAMPLE 5

Example 1 is repeated except that the enzyme-containing beads are made from a mixture of 38 parts of the enzyme concentrate, 60.5 parts of molten nonionic detergent having a melting point of 54° C (Wyandotte nonionic detergent 7135) and 1.5 parts of finely powdered $TiO_2$. The beads are light tan in color, in contrast to the brown color when $TiO_2$ is not present.

EXAMPLE 6

Example 5 is repeated, using 19 parts of a substantially salt-free enzyme concentrate containing 8 Anson units of proteolytic enzyme per gram, with 79.5 parts of the nonionic detergent and 1.5 parts of finely powdered $TiO_2$.

EXAMPLE 7

Example 1 is repeated, using, in place of the nonionic detergent, the nonionic waxy water-soluble material known as "Carbowax 4000" a substantially non-hygroscopic polyethylene glycol which is a polymer of ethylene oxide having an average molecular weight of about 3000–3700 (i.e. containing an average of about 68–84 ethylene oxide units) having a melting point of about 53°–56° C and a viscosity at 210° F of about 75–85 cps.

EXAMPLE 8

In place of the built detergent granules used in Examples 1–7 there are used spray-dried hollow granules, of higher builder salt content made up of a mixture of pentasodium tripolyphosphate; an organic detergent (sodium linear tridecylbenzenesulfonate), 6.75%; sodium silicate ($Na_2O$:$SiO_2$ ratio 1.0:2.35), 5.1%; optical brighteners, 0.28%; $H_2O$ 6% (plus or minus 1%), the balance being sodium sulfate and the total anhydrous phosphate solids content being 70%. The proportion of the enzyme-containing beads added to these granules is, in each case, such as to provide 1.2 Anson unit of proteolytic enzyme per 100 gram of the mixture.

The resulting solid mixtures are highly effective presoak products. In use, the product is mixed with water (e.g. to form a 0.19% solution of the whole solid mixture) and used for soaking soiled and stained cotton garments or other fabric material (e.g. for 1 to 24 hours) prior to washing said fabric materials.

The proteolytic enzyme used in the foregoing examples is subtilisin enzyme preparation, whose proteolytic activity is measured at a pH of 7.5; it has its maximum activity at a pH of about 8–9. The salt-containing powder used in Examples 1–5 is commercially available, as "Alcalase", from Novo Industri A/S, Copenhagen, Denmark.

A comparison of the products of Examples 1, 2, and 3 indicates that the products which have a higher content of enzyme concentrate have improved resistance to caking under high pressures at elevated temperatures (e.g. in summertime storage).

FIGS. 1 to 3 are photomicrographs, on the scale indicated, of the materials of Example 1a.

FIG. 1 is a view of the tan beads by transmitted light, with the beads immersed in paraffin oil. Because of the shallow depths of focus of the microscope, this picture shows, in effect, optical "sections" of the beads including some air bubbles (as evidenced by black-appearing circular areas within the beads).

FIG. 2 is a view of the beads by reflected light on a dark field.

Figure 1:
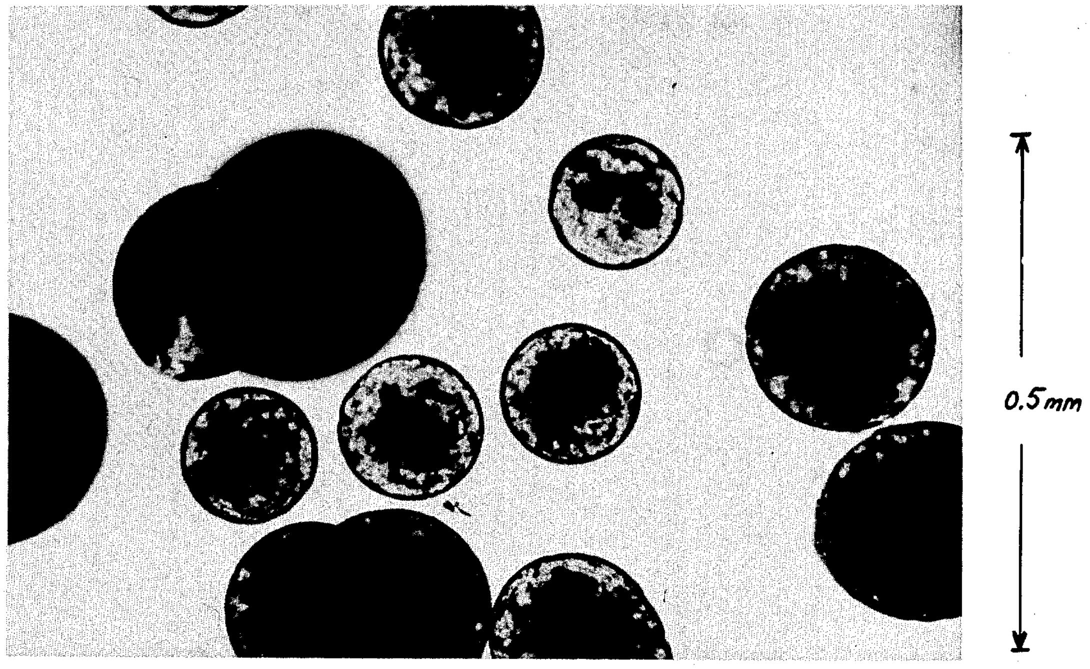
Figure 2:
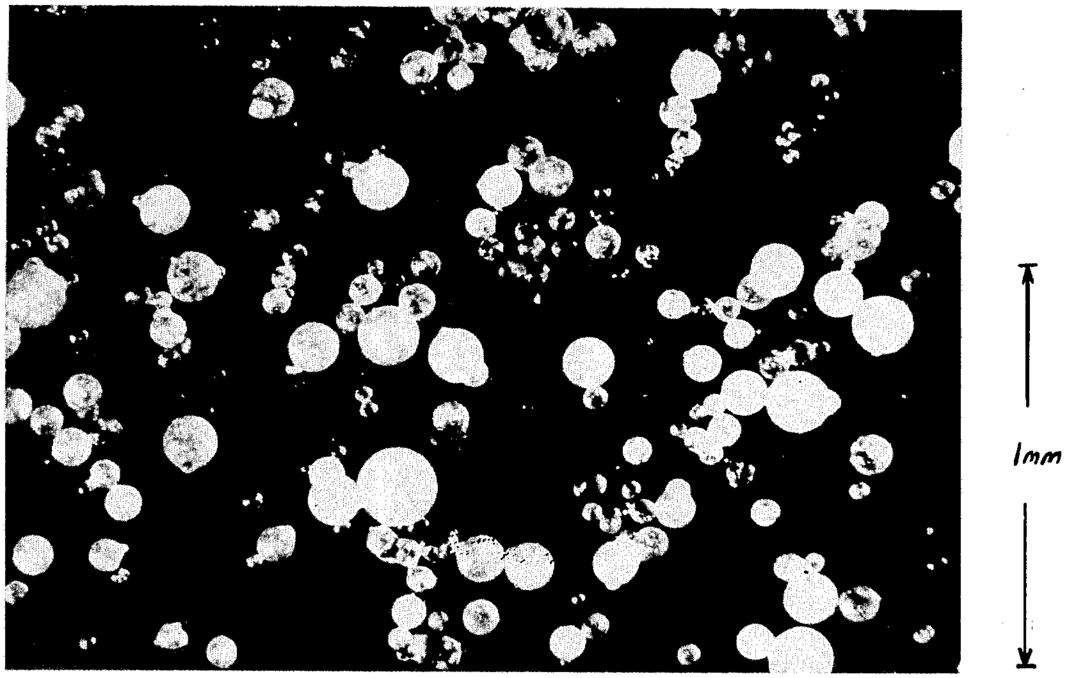
Figure 3:
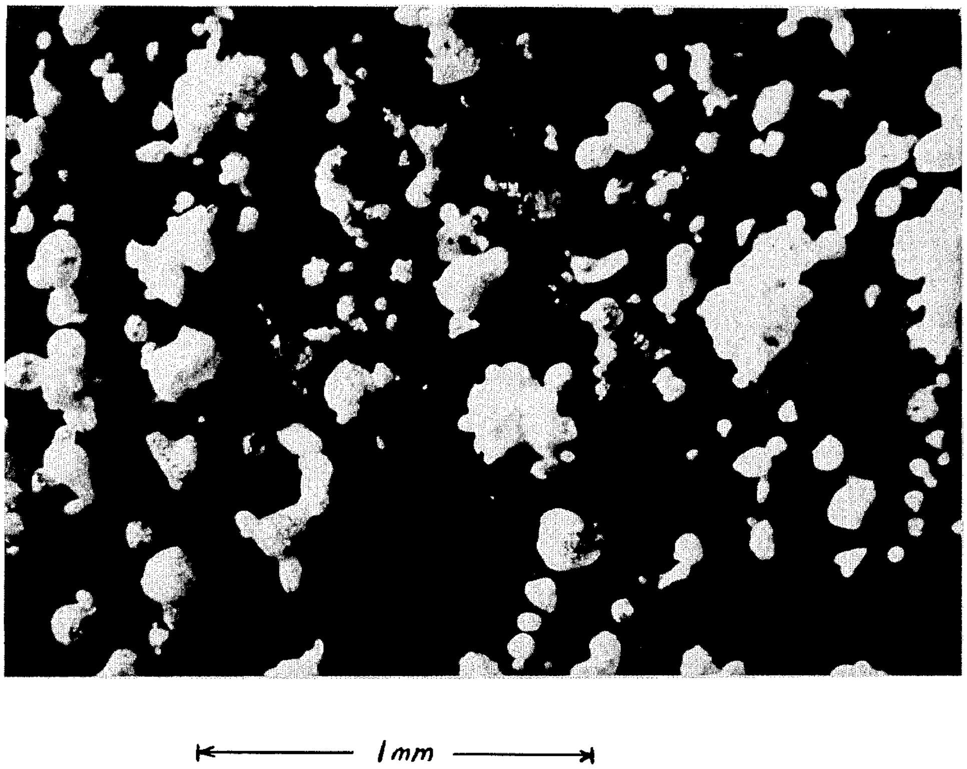

FIG. 3 is a view of the blend of beads and spray dried hollow granules, also by reflected light on a dark field In the Examples there is used a spray nozzle having an outlet orifice 0.041 inch in diameter. The spray pressures can be varied; and the apex angle of the conical spray pattern can also be varied, in known manner, as by varying the type of core used in the nozzle. Thus in Example 1 the fluid pressure at the nozzle is about 800 psig., and the angle is about 45°; for Example 2 the corresponding figures are about 700 psig. and 18°, and for Example 5 they are about 1800 psig. and 45°. The nonionic detergent used in Example 1 is an adduct of about 20–25 mols of ethylene oxide and one mol of a straight chain primary alkanol (e.g. of about 16 to 18 carbon atoms). In Example 4 the nonionic detergent is a biodegradable adduct of about 70 mols of ethylene oxide and one mol octylphenol.

In the method for determining dust content there is used a vertical chute of square cross section, about 20 cm. on each side, of smooth hardboard (Masonite) having a smooth (removable) hardboard base at the bottom. There is a horizontal slide for initially supporting the sample about 122½ cm. above the base. Somewhat above this slide there is a removable cover. By rapidly withdrawing the sample-supporting slide horizontally the sample is caused to fall onto the base. Exactly ten seconds after the rapid withdrawal of the slide, a second horizontal slide only 20 cm. above the base is pushed rapidly (horizontally) into the chute so as to cover the fallen sample and isolate it from the air-borne dust in the chute. Ten minutes later the second slide, carrying the dust which has settled thereon during the 10 minute period, is removed carefully and the dust is weighed. It will be understood that the device carries suitable sealing means (such as suitable stationary and hinged felt pads at the points where the slides enter the chute) to seal the chute from outside influences.

EXAMPLE 9 a. Example 5 is repeated using 5 parts of $TiO_2$ and 57 parts of the nonionic detergent, with the 38 parts of enzyme concentrate.

b. Example 9a repeated, using as the enzyme concentrate the protease, active at high pH, sold as Novo SP-72 having an assay of about 2 Anson units per gram, measured at pH 9. Each of the bead products a and b of this Example 9 is mixed with the following spray-dried detergents (I–VI) of hollow granular form, in proportions to provide, in the final mixture, about 0.5% of the enzyme concentrate (for the beads of Example 9a) and about 1% of the enzyme concentrte (for the beads of Example 9b), except that in the blends with the detergent VI the amount of the enzyme concentrate is 0.3% (for the beads of Example 9a) and 0.6% (for the beads of Example 9b).

I. spray dried granules as in Example 1, except that the content of phosphate is 45%.

II. spray dried granules as in Example 1, except that the content of phosphate is 34% and the granules also contain 6% of trisodium nitrilotriacetate ("NTA").

III. spray dried granules as in (II) above except that the sodium silicate has an $Na_2O:SiO_2$ of 2:1 and is present in amount of 8.5%.

IV. spray dried granules as in (II) above except that the granules also contain 1% NaOH.

V. spray dried granules as in (II) above except that the granules contain no soap, the alkylbenzenesulfonate content of the granules is 7%, the nonionic detergent content of the granules if 7% and the granules also contain 3% sodium carbonate.

VI. spray dried granules as in Example 1, except that the content of phosphate is 35%, the content of alkylbenzenesulfonate is 18% and the granules contain no soap or nonionic detergent.

Instead of the nonionic detergent, one may employ other solid, meltable materials. For instance, as shown in Example 7 a waxy, water-soluble ethylene oxide polymer which does not have a hydrophobic end group also gives good results. Among other materials, whose use is within the broader scope of the invention, are normally solid fusible binder materials which although water-insoluble are water-dispersible when mixed with granular washing products. Thus one may make the enzyme-containing beads of such materials as plastic long-chain fatty acids which form water-soluble soaps in the alkaline wash water (having a pH of say, about 8 or 9 or 10 or even 11) produced when a washing product containing a minor portion of the enzyme-containing beads is dispersed in water. Solid, meltable long chain fatty alcohols (such as long chain alkanols or fatty acid monoglycerides or diglycerides or polyols, or fatty alkanolamides, e.g. suitable monoethanolamides, diethanolamides or isopropanolamides such as the diethanolamide of myristic acid), may also be used. The materials may be used alone or in combination with each other; thus a relatively water-insoluble fatty acid or fatty alcohol may be blended (e.g. in 1:2, 1:1 or 2:1 ratio) with a highly water-soluble nonionic detergent to give a readily water-dispersible material. The same bead-forming techniques may be used as described above.

The granular washing products with which the beads are blended generally have particle diameters below 2mm., with the major proportion of the product being usually present as particles having particle diameters below 1mm., more preferably below 0.9 mm. As mentioned previously, the washing products may be, for example, presoak products, laundry detergent products, or dishwashing products. The beads of this invention are preferably added in amount such as to provide in the range of about 0.05 to 3 (more preferably in the range of about 0.1 to 1) Anson units of protease per 100 grams of the washing product. A typical presoak product contains a relatively high concentration of builder salt such as about 30 to 95% pentasodium tripolyphosphate (calculated as anhydrous pentasodium tripolyphosphate), about 2 to 10% of organic surface active detergent, plus other ingredients such as sodium silicate (which acts as a builder salt and also acts to inhibit corrosion of aluminum surfaces), brightening agents and sodium sulfate. A laundry detergent generally has a lower ratio of builder salt to organic surface active agent (e.g. a ratio in the range of about 5:1 to 15:1). Dishwashing products, designed for use in automatic dishwashers, are on the other hand usually more alkaline, containing a very high proportion of alkaline builder salt, such as a mixture of the pentasodium tripolyphosphate and sodium silicate; they contain little, if any, organic surface active detergent, e.g. about 0.2 to 3%, and usually also contain a minor proportion (e.g. 0.5 to 5%) of an agent to prevent water-spotting such as a dry water-soluble compound which on contact with water, liberates hypochlorite chlorine (e.g. a heterocyclic dichloroisocyanurate); alternatively, a chlorinated phosphate (such as the well known chlorinated trisodium phosphate) may be used to supply both hypochlorite chlorine and some phosphate.

In formulating the washing products, the water-soluble builder salts may be phosphates and particularly condensed phosphates (e.g. pyrophosphates or tripolyphosphates), silicates, borates and carbonates (including bicarbonates), as well as organic builders such as salts of nitrilotriacetic acid or ethylene diamine tetracetic acid. Sodium and protassium salts are preferred. Specific examples are sodium tripolyphosphate, potassium pyrophosphate, sodium hexametaphosphate, sodium carbonate, sodium bicarbonate, sodium sesquicarbonate, sodium tetraborate, sodium silicate, salts (e.g. Na salt) of methylene diphosphonic acid, disodium diglycollate, trisodium nitrilotriacetate, or mixtures of such builders, including mixtures of pentasodium tripolyphosphate and trisodium nitrilotriacetate in a ratio, of these two builders, of 1:10 to 10:1, e.g. 1:1.

The organic surface active agent may be an anionic, nonionic or amphoteric surface active agent; mixtures of two or more such agents may be used.

The anionic surface active agents include those surface active or detergent compounds which contain an organic hydrophobic group and an anionic solubilizing group. Typical examples of anionic solubilizing groups are sulfonate, sulfate, carboxylate, phosphonate and phosphate. Examples of suitable anionic detergents which fall within the scope of the invention include the soaps, such as the water-soluble salts of higher fatty acids or resin acids, such as may be derived from fats, oils and waxes of animal, vegetable origin, e.g. the sodium soaps of tallow, grease, coconut oil, tall oil and mixture thereof; and the sulfated and sulfonated synthetic detergents, particularly these having about 8 to 26, and preferably about 12 to 22, carbon atoms to the molecule.

As examples of suitable synthetic anionic detergents there may be cited the higher alkyl mononuclear aromatic sulfonates such as the higher alkyl benzene sulfonates containing from 10 to 16 carbon atoms in the alkyl group in a straight or branched chain, e.g., the sodium salts of higher alkyl benzene sulfonates or of the higher alkyl toluene, xylene and phenol sulfonates; alkyl naphthalene sulfonate, ammonium diamyl naphthalene sulfonate, and sodium dinonyl naphthalene sulfonate. In one preferred type of composition there is used a linear alkyl benzene sulfonate having a high content of 3- (or higher) phenyl isomers and a correspondingly low content (well below 50%) of 2- (or lower) phenyl isomers; in other terminology, the benzene ring is preferably attached in large part at the 3 or higher (e.g. 4, 5, 6 or 7) position of the alkyl group and the content of isomers in which the benzene ring is attached at the 2 or 1 position is correspondingly low. Particularly preferred materials are set forth in U.S. Pat. No. 3,320,174, May 16, 1967, of J. Rubinfeld.

Other anionic detergents are the olefin sulfonates, including long chain alkene sulfonates, long chain hydroxyalkane sulfonates or mixtures of alkenesulfonates and hydroxyalkane-sulfonates. These olefin sulfonate detergents may be prepared, in known manner, by the reaction of $SO_3$ with long chain olefins (of 8–25, preferably 12–21, carbon atoms) of the formula $RCH{=}CHR_1$, where R is alkyl and $R_1$ is alkyl or hydrogen, to produce a mixture of sultones and alkenesulfonic acids, which mixture is then treatd to covert the sultones to sulfonates. Examples of other sulfate or sulfonate detergents are paraffin sulfonates having, for example, about 10–20, preferably about 15–20, carbon atoms such as the primary paraffin sulfonates made by reacting long chain alpha olefins and bisulfites (e.g. sodium bisulfite) or paraffin sulfonates having the sulfonate groups distributed along the paraffin chain such as the products made by reacting a long chain paraffin with sulfur dioxide and oxygen under ultraviolet light followed by neutralization with NaOH or other suitable base (as in U.S. patents 2,503,280; 2,507,088; 3,260,741; 3,372,188 and German patent 735,096); sulfates of higher alcohols; salts of α-sulfofatty esters (e.g. of about 10 to 20 carbon atoms, such as methyl α-sulfomyristate or α-sulfotallowate).

Examples of sulfates of higher alcohols are sodium lauryl sulfate, sodium tallow alcohol sufate, Turkey Red Oil or other sulfated oils, or sulfates of mono- or di-glycerides of fatty acids (e.g. stearic monoglyceride monosulfate), alkyl poly (ethenoxy) other sulfates such as the sulfates of the condensation products of ethylene oxide and lauryl alcohol (usually having 1 to 5 ethenoxy groups per molecule); lauryl or other higher alkyl glyceryl ether sulfonates; aromatic poly (ethenoxy) ether sulfates such as the sulfates of the condensation products of ethylene oxide and nonyl phenol (usually having 1 to 6 oxyethylene groups per molecule).

The suitable anionic detergents include also the acyl sarcosinates (e.g. sodium lauroylsarcosinate) the acyl esters (e.g. oleic acid ester) of isethionates, and the acyl N-methyl taurides (e.g. potassium N-methyl lauroyl- or oleyl tauride).

The most highly preferred water soluble anionic detergent compounds are the ammonium and substituted ammonium (such as mono-, di- and triethanolamino), alkali metal (such as sodium and potassium) and alkaline earth metal (such as calcium and magnesium) salts of the higher alkyl benzene sulfonates, olefin sulfonates, the higher alkyl sulfates, and the higher fatty acid monoglyceride sulfates. The particular salt will be suitably selected depending upon the particular formulation and the proportions therein.

Nonionic surface active agents include those surface active or detergent compounds which contain an organic hydrophobic group and a hydrophilic group which is a reaction product of a solubilizing group such as carboxylate, hydroxyl, amido or amino with ethylene oxide or with the polyhydration product thereof, polyethylene glycol.

As examples of nonionic surface active agents which may be used there may be noted the condensation products of alkyl phenols with ethylene oxide, e.g., the reaction product of isooctyl phenol with about 6 to 30 ethylene oxide units; condensation products of alkyl thiophenols with 10 to 15 ethylene oxide units; condensation products of higher fatty alcohols such as tridecyl alcohol with ehtylene oxide; ethylene oxide addends of monesters of hexahydric alcohols and inner others thereof such as sorbitan monolaurate, sorbitol monooleate and mannitan monopalmitate, and the condensation products of polypropylene glycol with ethylene oxide.

A particularly suitable composition, for use as a granular detergent material contains a mixture of a linear alkylbenzenesulfonate, as previously described, soap and a nonionic detergent, with the soap and nonionic detergent being present in minor portions. The ratios of the amounts of (A) soap, and (B) nonionic detergent, to (C) the total amount of the synthetic anionic sulfate and sulfonate detergent, in this mixture, are preferably as follows: A:C, about 1:10 to 1:2, preferably about 1:4 to 1:6, on an anhydrous basis; B:C about 1:10 to 1:3, e.g. about 1:4 to 1:6, on an anhydrous basis. The component (C) may comprise a blend of the linear alkylbenzenesulfonate detergent with other anionic synthetic sulfate or sulfonate detergents (e.g. olefin sulfonates, paraffin sulfonates having the sulfonate groups distributed along the paraffin chain, or alkyl sulfates) with the alkylbenzenesulfonate constituting, say, ⅓, ½ or ⅔ of this blend.

Examples of suitable amphoteric detergents are those containing both an anionic and a cationic group and a hydrophobic organic group, which is advantageously a higher aliphatic radical, e.g. of 10–20 carbon atoms. Among these are the N-long chain alkyl aminocarboxylic acids (e.g. of the

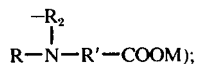

the N-long chain alkyl iminodicarboxylic acids (e.g. of the formula $RN(R'COOM)_2$) and the N-long chain alkyl betains (e.g. of the formula

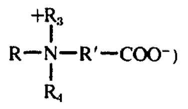

where R is a long chain alkyl group, e.g. of about 10–20 carbons, R' is a divalent radical joining the amino and carboxyl portions of an amino acid (e.g. an alkylene radical of 1–4 carbon atoms), N is hydrogen or a salt-forming metal, $R_2$ is a hydrogen or another monovalent substituent (e.g. methyl or other lower alkyl), and $R_3$ and $R_4$ are monovalent substituents joined to the nitrogen by carbon-to-nitrogen bonds (e.g. methyl or other lower alkyl substituents). Examples of specific amphoteric detergents are N-alkyl-beta-aminopropionic acid; N-alkyl-beta-iminodipropionic acid, and N-alkyl, N,N-dimethyl glycine; the alkyl group may be, for example, that dervied from coco fatty alcohol, lauryl alcohol, myristyl alcohol (or a lauryl-myristyl mixture), hydrogenated tallow alcohol, cetyl, stearyl, or blends of such alcohols. The substituted aminopropionic and iminodipropionic acids are often supplied in the sodium or other salt forms, which may likewise be used in the practice of this invention. Examples of other amphoteric detergents are the fatty imidazolines such as those made by reacting a long chain fatty acid (e.g. of 10 to 20 carbon atoms) with diethylene triamine and monohalocarboxylic acids having 2 to 6 carbon atoms, e.g. 1-coco-5-hydroxethyl-5-carboxymethylimidazoline; betaines containing a sulfonic group instead of the carboxylic group; betaines in which the long chain substituent is joined to the carboxylic group without an intervening nitrogen atom, e.g. inner salts of 2-trimethylamino fatty acids such as 2-trimethylaminolauric acid, and compounds of any of the previously mentioned types but in which the nitrogen atom is replaced by phosphorous.

Various other materials may be present in the granular washing products. Thus, materials such as the higher fatty acid amides may be added to improve detergency and modify the foaming properties in a desirable manner. Examples thereof are the higher fatty acid alkanolamides, preferably having 2–3 carbons in each alkanol group and a fatty acyl radical within the range of 10–18 carbons, preferably 10–14 carbons, such as lauric or myristic monoethanolamides, diethanolamides and isopropanolamides. Tertiary higher alkyl amino oxides such as having about 10–18 carbons in one alky group, e.g. lauryl or myristyl dimethylamino oxide, may be added also. Fatty alcohols of 10–18 carbons, such as lauryl or coconut fatty alcohols, or cetyl alcohol are suitable additives also. A hydrotropic material such as the lower alkyl aryl sulfonates, e.g. sodium toluene or xylene sulfonates, can assist processing also. In general, these materials are added in minor amounts, usually from about ½ to 10%, preferably 1 to 6%, based on the total solids.

The washing products may also contain optical brightening agents or fluorescent dyes (e.g. in amounts in the range of about 1/20 to 1/2%); germicidal ingredients such as halogenated carbanilides, e.g. tribromosalicylanilide, halogenated salicylanilide, e.g. tribromosalicylanilide, halogenated bisphenols, e.g. hexachlorophene, halogenated trifluoromethyldiphenyl urea, zinc salt of 1-hydroxy-2-pyridinethione and the like (e.g. in amounts in the range of about 1/50 to 2%); soil-suspending agents such as sodium carboxymethyl cellulose or polyvinyl alcohol, preferably both, or other soluble polymeric materials, such as methyl cellulose (the amount of suspending agent being, for example, in the range of about 1/20 to 2%); antioxidants such as 2,6-di-tert-butylphenol, or other phenolic antioxidant materials (e.g. in amounts in the range of about 0.001 to 0.1%), coloring agents, bleaching agents and other additives.

A conventional bleaching agent commonly present in washing products is sodium perborate usually present as sodium perborate tetrahydrate in a concentration in the range of, say, about 5 to 30%; sodium perborate monohydrate may also be used. The German Offenlengungschrift 1,800,508 previously mentioned teaches that the serine type proteases there described have superior stability against perborate and beads made with these enzymes are particularly suitable for use with perborate-containing compositions.

The enzyme-containing beads and the wahsing products with which they are mixed preferably contain biodegradable organic materials. In one embodiment any builder salts are also wholly or partly biodegradable.

Although the present invention has been described with reference to particular embodiments and examples, it will be apparent to those skilled in the art that variations and modifications can be substituted therefor without departing from the principles and true spirit of the invention.

We claim:

1. A process for manufacturing free-flowing substantially dust-free, substantially spherical, enzyme-containing beads consisting essentially of a water dispersible solid, fusible, substantially anhydrous, nonionic detergent binder having a melting point up to about 60° C., having dispersed therein an enzyme concentrate consisting essentially of proteolytic enzyme, said binder having a hydrophilic polyethylene oxide chain of 6 to 84 ethylene oxide units, the concentration of the proteolytic enzyme in said beads being sufficient so that the beads contain about 0.1 to 5 Anson units per gram, with substantially all of said beads passing through a 10 mesh U.S. Standard Sieve Series screen and at most about 11.2% of said beads passing through a 100 mesh U.S. Standard Sieve Series screen, which comprises blending a powdered concentrate of said enzyme with said binder in molten form and spraying droplets of said blend through a spray nozzle into cool air in a cooling tower to solidify said droplets and form said beads.

2. A process according to claim 1 wherein the binder has a melting point in the range of 45° to 60° C. and said blend is sprayed at a temperature below 65° C.

3. A process according to claim 2 wherein the blend of powdered enzyme concentrate and binder includes about 5 to 50% of enzyme concentrate and 95 to 50% of nonionic detergent and is sprayed at a temperature about 5° C. above the melting point of the binder into cooling air which is at a temperature of about 13° to 24° C.

* * * * *